(12) United States Patent
Vanmoor

(10) Patent No.: US 6,168,384 B1
(45) Date of Patent: Jan. 2, 2001

(54) PROPELLER BLADE CONFIGURATION

(76) Inventor: Arthur Vanmoor, 153 E. Palmetto Park Rd., Boca Raton, FL (US) 33427

( * ) Notice: Under 35 U.S.C. 154(b), the term of this patent shall be extended for 0 days.

(21) Appl. No.: 09/211,110

(22) Filed: Dec. 14, 1998

(30) Foreign Application Priority Data

Dec. 12, 1997 (NL) .......................................................... 100774

(51) Int. Cl.[7] ...................................................... B63H 1/26
(52) U.S. Cl. ...................... 416/243; 416/242; 416/DIG. 2
(58) Field of Search .............................. 416/223 R, 242, 416/243, 228, 235, 237, DIG. 2, DIG. 5

(56) References Cited

U.S. PATENT DOCUMENTS

| | | | |
|---|---|---|---|
| 2,638,171 | * 5/1953 | Foss ...................................... | 416/242 |
| 3,128,939 | * 4/1964 | Szydlowski ........................... | 416/242 |
| 3,174,681 | * 3/1965 | Monroe ................................. | 416/242 |
| 4,124,329 | * 11/1978 | Romanov et al. ..................... | 415/85 |
| 5,161,953 | * 11/1992 | Burtis ................................... | 416/242 |
| 5,575,624 | * 11/1996 | Bogage ................................. | 416/242 |

\* cited by examiner

Primary Examiner—Edward K. Look
Assistant Examiner—James M McAleenan
(74) Attorney, Agent, or Firm—Herbert L. Lerner; Laurence A. Greenberg; Werner H. Stemer

(57) ABSTRACT

A novel concept for a propeller blade configuration incorporates the model of the natural wave behavior. The leading edge of the propeller blade is parallel to the trailing edge, but offset by a given amplitude. The surfaces between the leading and trailing edges are rounded so as to promote proper fluid sheet formation along the surface and to reduce undesirable vortice formation. Best results are obtained by modeling the surfaces along a sine or tangent function.

7 Claims, 2 Drawing Sheets

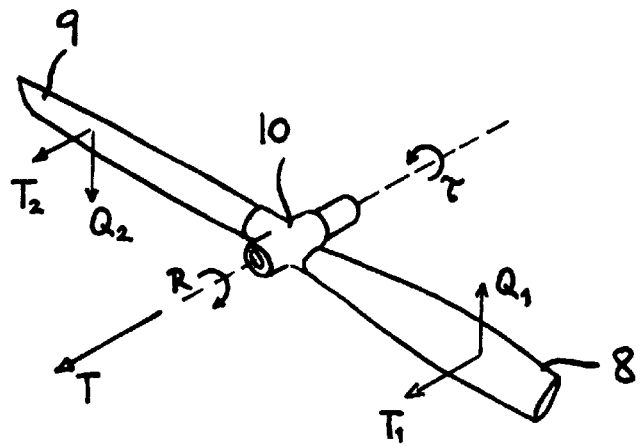
FIG. 4
PRIOR ART
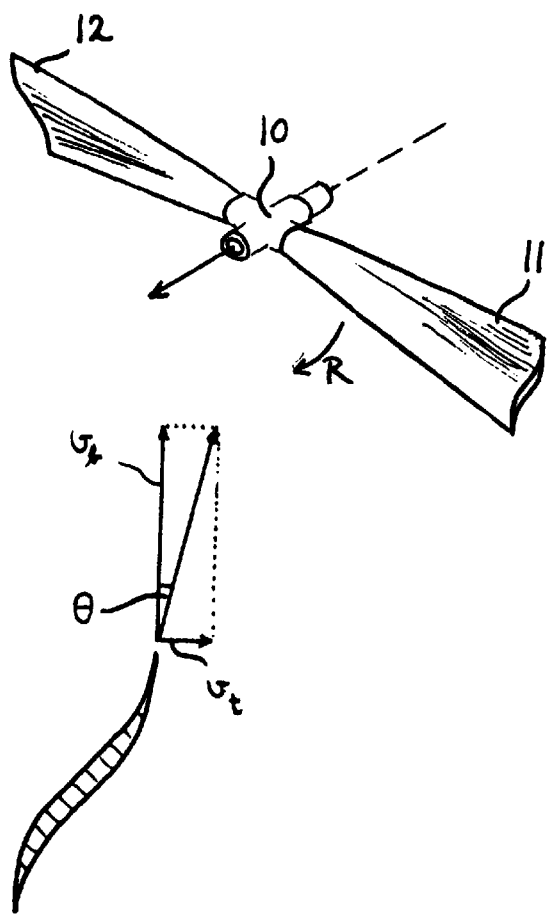
FIG. 5
FIG. 6

PROPELLER BLADE CONFIGURATION

BACKGROUND OF THE INVENTION

Field of the Invention

The invention lies in the field of fluid dynamics. In particular, the invention pertains to aircraft and stationary fluid propellers.

The aerodynamic principle utilized in propellers is the effect of the dynamic pressure of the fluid to be propelled on the propeller blade. The resultant dynamic pressure is the sum of all partial pressures acting on the various surfaces of the blades. These effects are similar to the principles that are applicable in heavier-than-air craft which are lifted in air by the dynamic pressures acting on the craft as it is being propelled through the air. The dynamic pressure is proportional to the relative speed between the air and the propeller blade. Air resistance acting on poor aerodynamic shapes translates into drag, which is defined as the force counteracting the forward thrust force or torque of the propeller blade. A certain amount of drag cannot be avoided. However, the drag force can be minimized by the proper design of the shape of the blades and its maximization in terms of the useful translational speeds. The object is to minimize drag resistance and to maximize thrust force, i.e., to optimize the thrust-to-drag ratio.

The principles described herein are equally applicable to thrust propellers that are used to propel vehicles relative to the atmospheric air and pump propellers that are stationary relative to the ground and that are used to pump a flow of air (or other fluid).

Low speed, low power propellers are relatively simple. The thrust is obtained by a vertical force component acting perpendicularly to a movement of the blades. A thin plate with a narrow attack surface and a slight backward curve (camber) usually provides a sufficient amount of thrust. In other words, the pitch angle of the forward-most portion of the plate is approximately zero relative to the plane defined by the propeller sweep and the blade has a backward curve by a few degrees. With the relatively low speeds of the simple pump propellers, the slightly curved shape of the blade is generally acceptable. As the blade speed is increased, however, the thrust-to-drag ratio very quickly deteriorates. The drag is thereby caused by the turbulent flow, i.e., the vortices or eddies, at the trailing edge of the blade.

Propeller inefficiency is also affected by micro-friction between the exposed surfaces and the innermost layer (flow sheet) of the fluid impinging and being deflected by the surfaces. This invention, however, is primarily concerned with improving the macro-structure and the thrust-to-drag ratio of aircraft and pump propeller blades.

Similarly to aircraft wing design, where most of the lift on a wing is due to the vacuum effect above the wing (the negative pressure compensates for the fluid compression forward of and below the wing), the "shaded" surface of the propeller blade is important as well. The typical ratio in wings is that approximately two-thirds of the lift originates from the upper vacuum effect and one-third is due to the compression below the wing. This recognition, in the early days of wing design, resulted in the development of the airfoil. The airfoil shape at first glance appears counterintuitive. The airfoil has a thickened forward section which tapers to a very thin tip structure at the trailing edge. Nevertheless, the basic airfoil shape was also adopted for propeller blades.

As noted, the principles concerning vortice creation and drag in wing designs are similarly applicable to propellers and rotor blades. Furthermore, the principles concerning aircraft propellers are also extendible to watercraft. There, the eddie formation principles applicable to the relatively thin fluid air find their equivalents in the denser fluid water with the formation of eddie current vortices, cavitation, and super-cavitation.

SUMMARY OF THE INVENTION

It is accordingly an object of the invention to provide a novel propeller blade configuration, which further minimizes the above-mentioned disadvantages of the heretofore-known devices of this general type and which proposes a novel principle in propeller blade design that maximizes the thrust-to-drag ratio of propeller blades and the corresponding efficiency of propulsion propellers and stationary pump propellers.

With the foregoing and other objects in view there is provided, in accordance with the invention, a propeller configuration, comprising:

a rotatable hub defining an axis of rotation;

at least two blade structures attached to the hub substantially perpendicular to the axis of rotation;

each of the blade-structures having a leading edge, a trailing edge, a forward surface extending from the leading edge to the trailing edge, and a rear surface extending from the leading edge to the trailing edge;

the forward surface and the rear surface at the leading edge extending substantially parallel to and offset from the forward surface and the rear surface at the trailing edge.

The term propeller, herein, refers to propulsion propellers (aircraft, watercraft) as well as to stationary propellers used in high-power fans (wind tunnels, high velocity fluid pumps) and stationary turbines.

In accordance with an added feature of the invention, the forward surface and the rear surface are defined by a function y=cos x, where, $0 \leq x \leq \pi$ in radians, x being approximately equal to zero at the leading edge and x being approximately equal to $\pi$ at the trailing edge.

In accordance with an additional feature of the invention, the forward surface is defined by a function y=(cos x)+(sin (x/z)) and the rear surface is defined by a function y=(cos x)−(sin (x/z)), where $0 \leq x \leq \pi$ in radians, and z>$\pi$, x being approximately equal to zero at the leading edge and approximately equal to $\pi$ at the trailing edge.

In accordance with a further feature of the invention, z is a constant, or z is a function of x and has a maximum value smaller than a maximum value of x.

In accordance with again an added feature of the invention, the forward surface and the rear surface are defined by a function y=a cos x, where $0 \leq x \leq \pi$ in radians, x being approximately equal to zero at the leading edge and x being approximately equal to $\pi$ at the trailing edge, and a is a real number.

The term a may be constant, or it may be a function of x and have a maximum value smaller than a maximum value of x.

In accordance with again another feature of the invention, the forward surface and the rear surface are defined by a tangent function.

In accordance with again a further feature of the invention, the offset between the leading edge and the trailing edge increases with a distance from said.

In accordance with a concomitant feature of the invention, the forward surface and the rear surface are defined by a function y=d cos x, where $0 \leq x \leq \pi$ in radians, x being approximately equal to zero at the leading edge and approximately equal to $\pi$ at the trailing edge, and wherein d is proportional to the distance from the hub at which the blade structure is attached and assumes a maximum of no more than 1.

Other features which are considered as characteristic for the invention are set forth in the appended claims.

Although the invention is illustrated and described herein as embodied in a propeller configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagrammatic perspective view of a prior art two-blade air propeller;

FIG. 5 is a perspective view of a two-blade propeller according to the invention; and FIG. 6 is a diagrammatic sectional view through one of the blades in FIG. 5.

DESCRIPTION OF THE PREFERRED EMBODIMENTS

Figure 1:
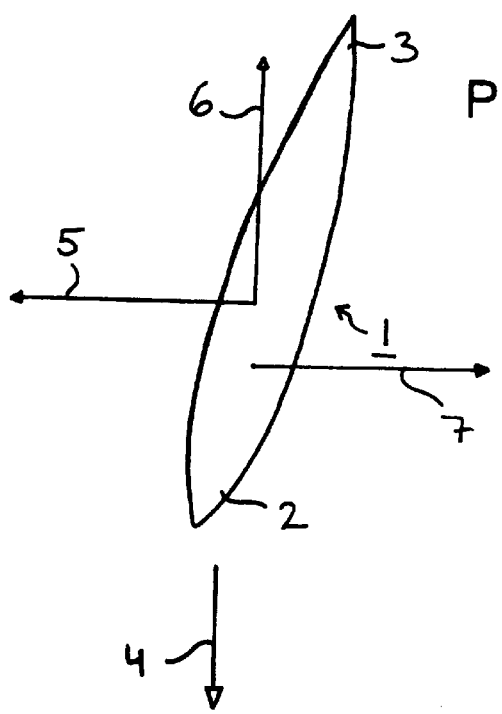
FIG. 1 is a section taken through a prior art propeller blade structure.

Referring now to the figures of the drawing in detail and first, particularly, to FIG. 1 thereof, there is seen a basic blade configuration. The blade 1 has a thickened, slightly rounded leading edge 2 and a slightly narrower, wedge-shaped trailing edge 3. The forward movement of the blade—relative to the air—is indicated by a velocity vector 4. It is noted, in this regard, that the various effective vectors illustrated in the figures are not drawn to scale. The thrust-to-drag ratio is defined by the ratio of a thrust vector 5 to a drag vector 6. In the basic model, an aircraft would be in equilibrium flight—the airspeed and altitude remain constant—when the value of a drag vector 6 equals the value of the thrust vector 5 (equal and opposite forces cancel each other in zero acceleration), and the drag vector 7 is offset by the engine thrust forcing the propeller to rotate (e.g. propeller or turbine).

Figure 2:
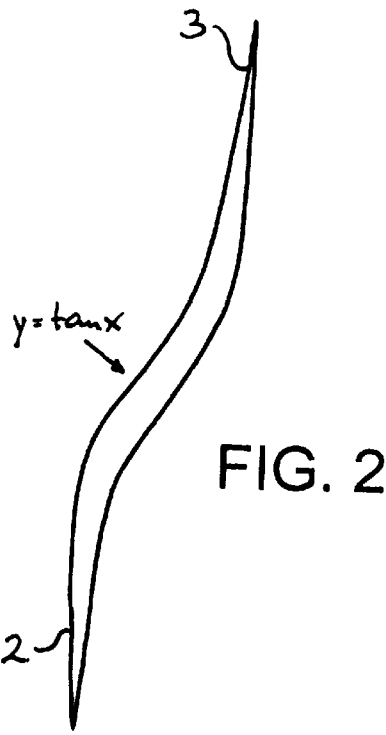
FIG. 2 is a section taken through a propeller blade according to the invention.
Figure 3A:
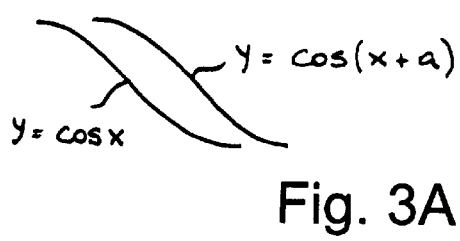
FIG. 3A is a plot of two sine functions which are offset from one another by a certain phase angle defining a thickness of the propeller blade according to the invention.
Figure 3:
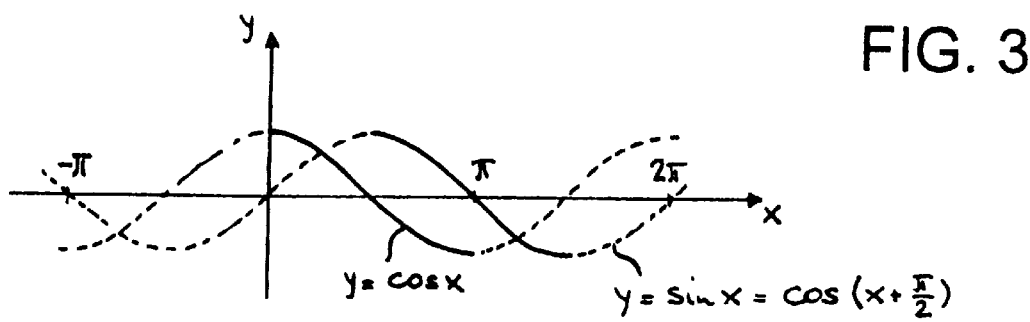
FIG. 3 shows a plot of a sine and cosine function as applied to the invention.

Referring now to FIGS. 2 and 3, the propeller blade according to the invention has a cross-sectional shape that may be modeled as a sinusoidal curve shape or a tangent function. The forward surface (to the left in FIG. 1) and the rear surface (to the right in FIG. 1) of the novel blade very nearly follow a sine wave, from cos 0 to cos $\pi$ (in radians), which is equivalent to the curve from sin ½$\pi$ to sin 1.5$\pi$. In other words, the surfaces approximate the function:

$$y = \cos x, \text{ where } 0 \leq x \leq \pi (\text{rad}). \tag{1}$$

The darkened segments in FIG. 3 are representative of the function segment in equation (1).

In the illustrated embodiment it is evident that the forward and rear surfaces do not quite follow the exactly equal functions. This is due to the added structural support provided at the center of the novel propeller blade. The thickened configuration may be modeled by the following modification of equation (1):

$$y = (\cos x) \pm (\sin (x/z)) \tag{2}$$

where $0 \leq x \leq \pi$, and $z > \pi$. The forward curve is modeled by adding the sine component (the + in the ± applies) and the lower curve is modeled by substracting the sine component (the − in the ± applies) from equation (1). The thickness is adjusted with the z component, which may be a constant ($z > \pi$).

As shown in FIG. 4, a very similar structural thickness of the blade is obtained by simply offsetting the forward surface from the rear surface by a given phase difference. For instance, the lower curve would then be represented by y=cos x and the upper curve by y=cos (x+z) with z being a constant somewhere between 0.2 and 0.5.

Furthermore, the curvature of the surfaces may be "softened" by reducing the amplitude of the function. Accordingly, equation (1) would be modified as follows:

$$y = a \cos x \tag{3}$$

where $0 \leq x \leq \pi$, and a=constant or a=f(x). Combining equation (3) with equation (2), the following modification results:

$$y = a \cos x \pm (\sin (x/z)) \tag{4}$$

In an alternative embodiment, the blade shape may be modeled as a tangent function, y=tan x=sin x/cos x.

It is advantageous to introduce a further variable in the shape function, namely the distance of the specific blade chord from the rotor hub. In terms of the above equations, the variable may thereby appear in the variable w (amplitude) or in the variable z (thickness). For example, the amplitude of the curve may increase with the distance from the hub and with the attendant shortening of the blade chord. For example, equation (3) would become:

$$y = d \cos x \tag{5}$$

where $0 \leq x \leq \pi$, and d is the distance from the hub. The value of d is weighted so that $0 \leq d \leq 1$. At d=0 (directly at the hub), the function becomes y=0 and the curve vanishes to a straight line. At d=1 (at the point of maximum blade curvature), the curve has its full amplitude expressed by equation (1).

Reference will now be had to the propeller illustrations in FIGS. 4–6.

The prior art propeller shown in FIG. 4 utilizes the airfoil principle of FIG. 1 with regard to its aerodynamic shape. In the two-blade prop shown, the thrust T results from the two partial thrusts $T_1$ and $T_2$ generated by the two propeller blades 8 and 9. The rotation R of the propeller and the resultant reaction torque $\tau$ are indicated with the rounded arrows. In most low-speed aircraft, the attack angle of the blades is set with the attachment of the blades in a hub 10. In VTOL (vertical takeoff and landing craft) such as helicopters, the blades are hinged in the hub 10. It is accordingly possible to adjust the blade angle to the respective air speed.

The novel concept is applicable to both fixed and hinged blade configurations. With reference to FIG. 5, the curvature of the blade may be defined with a simple sine function as in equation (1). The leading edge of the blade, thereby should be oriented to "cut" perpendicularly into the opposing air mass. With reference to FIG. 6, the proper cutting angle θ is vectorally defined by the addition of the mutually orthogonal vectors airspeed $v_t$ and blade speed $v_b$. The vector $v_b$ lies within the rotation plane swept by the propeller. The cutting angle θ is the angle enclosed by the rotation plane swept by the propeller and the orientation of the leading edge of the blade. In fixed blade configurations, the cutting angle is defined by maximizing the vectors airspeed and blade speed for the specific craft. In hinged blade configurations, of course, these vectors are variable.

The trailing edge of the blade extends substantially parallel to the leading edge, offset by the amplitude of the curve.

The variable amplitude (softening of the curve) described above with equation (3) is particularly advantageous in the context of air propellers. Since the speed of the blade increases radially from the hub outward, it is advantageous for the amplitude weighting (variable d in equation (5)) to be a function of the radius. For instance, d could be made zero directly at the hub and d=1 at the maximum radius, i.e., the outer edges of the propeller blades. This is further advantageous in terms of the attachment of the blades at the hub.

It will be understood that, while only two blades are illustrated in FIGS. 4 and 5, the novel concept is applicable to other multi-blade systems as well. Typically, faster craft are provided with more blades. The principle is also applicable to helicopter rotor blades. As noted, those blades are typically hinged and their attack angle is adjustable.

Finally, it is a further advantage of the novel propeller shape that the blades produce less noise than the prior art shapes.

I claim:

1. A propeller configuration, comprising:

a rotatable hub defining an axis of rotation;

at least two blade structures attached to said hub substantially perpendicular to said axis of rotation;

each of said blade structures having a leading edge, a trailing edge spaced from said leading edge, a forward surface extending from said leading edge to said trailing edge, and a rear surface extending from said leading edge to said trailing edge;

said forward surface at said leading edge extending substantially parallel to and offset from said forward surface at said trailing edge, and said rear surface at said leading edge extending substantially parallel to and offset from said rear surface at said trailing edge;

wherein an offset between said forward surface at said leading edge and said forward surface at said trailing edge is less than a distance between said leading and trailing edges; and said forward surface and said rear surface converging at said leading edge to form a sharp leading edge and converging at said trailing edge to form a sharp trailing edge.

2. The propeller configuration according to claim 1, wherein said forward surface and said rear surface are defined by a function y=a cos x, where $0 \leq x \leq \pi$ in radians, x being approximately equal to zero at said leading edge and x being approximately equal to π at said trailing edge, and a is a real number defining a given thickness of said blade structures.

3. The propeller configuration according to claim 2, wherein a is a constant.

4. The propeller configuration according to claim 2, wherein a is a variable having a maximum value smaller than a maximum value of x.

5. The propeller configuration according to claim 1, wherein said forward surface and said rear surface are defined by a tangent function.

6. The propeller configuration according to claim 1, wherein the offset between said leading edge and said trailing edge increases with a distance from a point of attachment of said blade structure.

7. The propeller configuration according to claim 6, wherein said forward surface and said rear surface are defined by a function y=d cos x, where $0 \leq x \leq \pi$ in radians, x being approximately equal to zero at said leading edge and approximately equal to π at said trailing edge, and wherein d is proportional to the distance from the point of attachment of said blade structure and assumes a maximum of no more than 1.

* * * * *